3,036,098
6-FLUOROMETHYL-17-HYDROXY-9,11-DICHLORO-PROGESTERONES AND THEIR 17-ESTERS

Albert Bowers and John Edwards, Mexico City, Mexico, assignors to Syntex S.A., Mexico City, Mexico, a corporation of Mexico
No Drawing. Filed Nov. 10, 1960, Ser. No. 68,377
22 Claims. (Cl. 260—397.45)

The present invention relates to novel cyclopentanophenanthrene compounds and to a novel process for the production thereof.

More particularly the invention relates to novel C-6 monofluoromethyl and C-6 polyfluoromethyl progestational hormone derivatives and more specifically to $9\alpha,11\beta$-dichloro-$\Delta^4$-pregnene-3,20-diones which may also contain a hydroxy or acyloxy group at C-17$\alpha$ and/or at C-21, a methyl group in $\alpha$ or $\beta$ steric configuration at C-16 and further unsaturation at C-1,2 and/or at C-6,7.

The novel compounds of the present invention which are potent progestational agents possessing an unusually high degree of progestational activity when administered orally are represented by the following formulas:

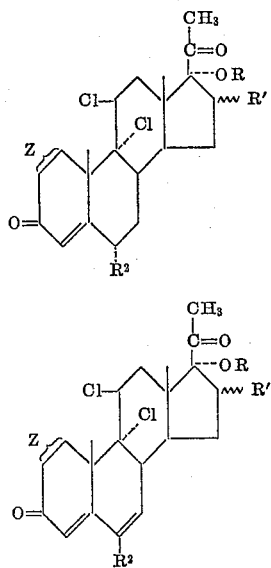

In the above formulas R represents hydrogen or a hydrocarbon carboxylic acyl group of less than 12 carbon atoms, R' represents hydrogen, $\alpha$-methyl or $\beta$-methyl, $R^2$ represents the monofluoromethyl, difluoromethyl or trifluoromethyl group and Z indicates a double bond or a saturated linkage between C-1 and C-2.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy, containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The novel compounds of the present invention may be prepared by a process illustrated by the following equation:

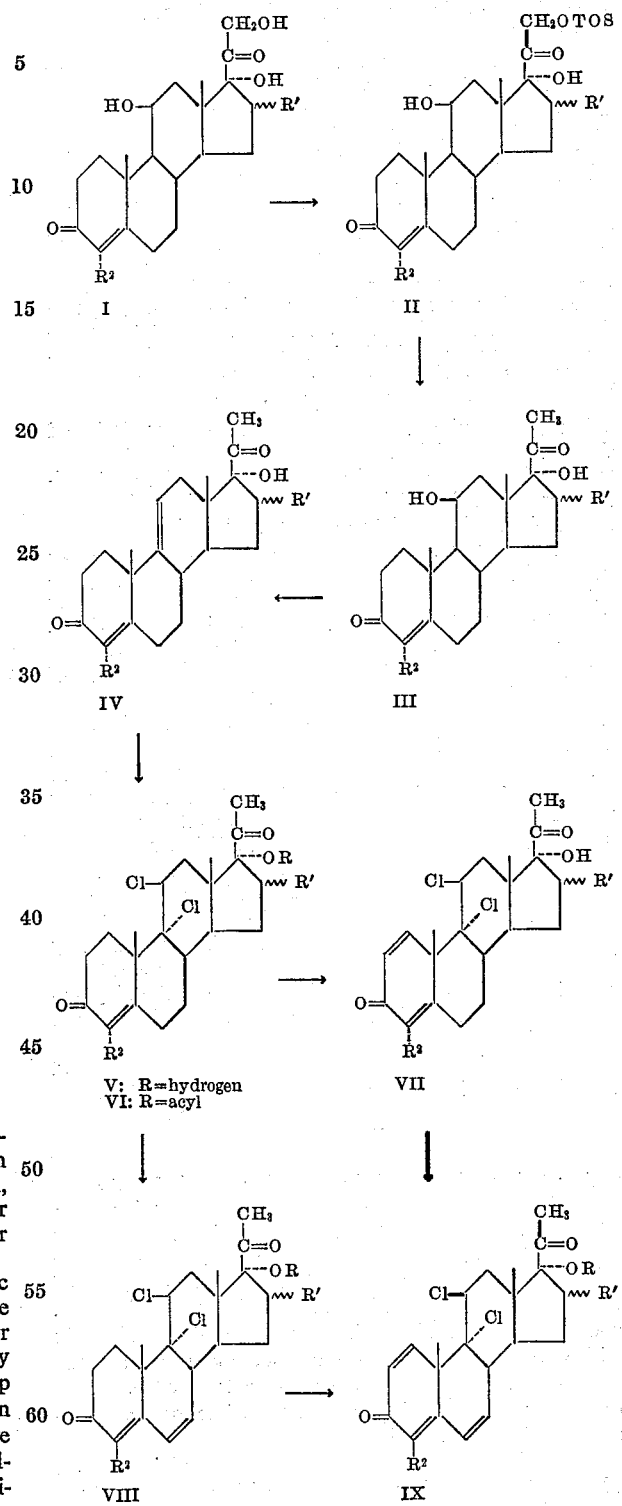

In the above formulas Tos represents the tosylate group and R, R' and R² have the same meaning as previously set forth.

In practicing the process outlined above, a 6α-monofluoromethyl or a 6α-polyfluoromethyl derivative of Δ⁴-pregnene-11β,17α,21-triol-3,20-dione or of the 16-methyl derivatives thereof (I) disclosed in our copending application Serial No. 68,374 filed November 10, 1960, is reacted with p-toluenesulfonic acid chloride in pyridine solution for 16 hours at 0° C. to form the 21-tosylate (II) which upon refluxing with an alkali metal iodide such as sodium iodide and acetic acid for one hour, is converted into the 21-desoxy compound (III). The latter compound is then dehydrogenated at C–9, 11 by reaction with an organic sulfonyl chloride, preferably methanesulfonyl chloride in a solvent such as dimethylformamide and in the presence of a tertiary amine such as pyridine at 90° C. for about two hours to thus form the 9(11)-dehydro compounds (IV). By treating the latter compounds with a slight excess of a molar equivalent of chlorine in an inert solvent such as carbon tetrachloride at 15° C. for a period of about 10 minutes, there are formed the 6α-monofluoromethyl - 9α,11β - dichloro - Δ⁴ - pregnen - 17α-ol-3,20-dione and 6α-polyfluoromethyl-9α,11β-dichloro-Δ⁴ - pregnen - 17α - ol - 3,20 - dione (V:R=hydrogen) with or without the methyl group at C–16. For preparation of the esters thereof (VI:R=acyl), the latter compounds are reacted with hydrocarbon carboxylic acid anhydrides of less than 12 carbon atoms in benzene solution in the presence of p-toluenesulfonic acid.

For introduction of a double bond between C–1 and C–2 the 9α,11β-dichloro compounds (V and VI) are refluxed with 2,3-dichloro-5,6-dicyanobenzoquinone in dioxane solution for 24 hours or with selenium dioxide in t-butanol solution and the presence of pyridine, to thus form 6α-monofluoromethyl-9α,11β-dichloro-Δ¹,⁴-pregnadien-17α-ol-3,20-dione or 6α-polyfluoromethyl-9α,11β-dichloro-Δ¹,⁴-pregnadien-17α-ol-3,20-dione or the esters thereof (VII) with or without the methyl group at C–16.

For introduction of a double bond at C–6,7 the 6α-monofluoromethyl or 6α-polyfluoromethyl derivatives of 9α,11β-dichloro-Δ⁴-pregnen-17α-ol-3,20-dione (V and VI) or of 9α,11β - dichloro - Δ¹,⁴ - pregnadien-17α-diol-3,20-dione (VII) or of the esters thereof or the C–16 methyl derivatives are refluxed with chloranil in a solvent such as t-butanol or a mixture of acetic acid-ethyl acetate for 8 to 24 hours to form the 6-monofluoromethyl or 6-polyfluoromethyl derivatives of 9α,11β-dichloro-Δ⁴,⁶-pregnadien-17α-ol-3,20-dione (VIII), of 9α,11β-dichloro-Δ¹,⁴,⁶-pregnatrien-17α-ol-3,20-dione (IX) or of the esters thereof with or without the methyl substituent at C–16. The Δ¹,⁴,⁶-pregnatriene compounds can also be formed by dehydrogenation at C–1,2 of the Δ⁴,⁶-pregnadiene compounds (VIII) by reaction with 2,3-dichloro-5,6-dicyano-1,4-benzoquinone or in selenium dioxide in the manner described above.

The following examples serve to illustrate but are not intended to limit the scope of the present invention:

Example I

A solution of 5 g. of 6α-monofluoromethyl-hydrocortisone in 30 cc. of a mixture of pyridine and chloroform (9:1) was cooled to 0° C. Under stirring there was added 1.3 g. of p-toluenesulfonyl chloride, the mixture was kept for 16 hours at 0° C., diluted with 100 cc. of chloroform, washed with diluted hydrochloric acid, water, aqueous sodium bicarbonate solution and again with water, dried over anhydrous sodium sulfate and the solvent was evaporated under reduced pressure. Thus there was obtained the crude 21-tosylate of 6α-monofluoromethyl-hydrocortisone.

A solution of the above crude compound in 200 cc. of glacial acetic acid was treated with 14 g. of sodium iodide and the mixture was refluxed for 1 hour, poured into ice water and extracted several times with methylene chloride; the extracts were combined, washed successively with aqueous sodium carbonate solution, sodium sulfite solution and water and then evaporated. By crystallization of the residue from acetone-hexane there was obtained 6α-monofluoromethyl - Δ⁴ - pregnene-11β,17α-diol-3,20-dione.

A mixture of 6 g. of the latter compound, 110 cc. of recently distilled dimethylformamide, 7.2 cc. of pyridine and 4.8 cc. of methanesulfonyl chloride was heated for 2 hours at 90° C. The cooled mixture was poured into aqueous saturated sodium bicarbonate solution and the product was extracted with methylene chloride; the extract was washed with water, dried over anhydrous sodium sulfate and the solvent was evaporated. The residue was chromatographed on 180 g. of silica gel, eluting the product with methylene chloride-acetone (9:1); recrystallization of the product from methylene chloride-methanol yielded 6α-monofluoromethyl-Δ⁴,⁹⁽¹¹⁾-pregnadien-17α-ol-3,20-dione.

A solution of 2 g. of 6α-monofluoromethyl-Δ⁴,⁹⁽¹¹⁾-pregnadien-17-ol-3,20-dione, in 20 cc. of chloroform was treated under continuous stirring and in the course of 5 minutes with a solution of 420 mg. of chlorine (1.05 molar equivalents) in 15 cc. of carbon tetrachloride. The mixture was kept for 5 minutes at room temperature, then treated with 10 cc. of 5% aqueous sodium carbonate solution and the product was extracted several times with chloroform. The combined extract was washed with water to neutral, dried over anhydrous sodium sulfate and evaporated to dryness. The residue crystallized from acetone-hexane to yield 6α-monofluoromethyl-9α,11β-dichloro-Δ⁴-pregnen-17α-ol-3,20-dione.

Example II

A solution of 1 g. of the above compound in 50 cc. of benzene was treated with 2 cc. of acetic anhydride and 1 g. of p-toluenesulfonic acid; the mixture was kept at room temperature for 48 hours, washed well with water, sodium carbonate solution and water to neutral, dried over anhydrous sodium sulfate and evaporated to dryness; by chromatography of the residue on neutral alumina and recrystallization of the solid eluates from acetone-hexane, there was obtained 6α-monofluoromethyl - 9α,11β - dichloro-17α-acetoxy progesterone.

Example III

A mixture of 1 g. of 6α-monofluoromethyl-17α-hydroxyprogesterone, 20 cc. of dioxane, 700 mg. of 2,3-dichloro-5,6-dicyano-1,4-benzoquinone was refluxed for 24 hours. It was then cooled, the 2,3-dichloro-5,6-dicyano-1,4-benzohydroquinone formed during the reaction filtered off and the filtrate evaporated to dryness. The residue was dissolved in acetone and filtered through 10 g. of alumina. Crystallization from acetone-hexane gave 6α-monofluoromethyl-9α,11β-dichloro - Δ¹,⁴ - pregnadien-17α-ol-3,20-dione.

A solution of 500 mg. of the above compound in 25 cc. of benzene was treated with 1 cc. of propionic anhydride and 500 mg. of p-toluenesulfonic acid, the mixture kept at room temperature for 40 hours, washed with sodium carbonate solution and water to neutral, dried and evaporated to dryness. Chromatography of the residue gave 6α - monofluoromethyl-9α,11β-dichloro - Δ¹,⁴ - pregnadien-17α-ol-3,20-dione propionate.

Example IV

By following the method of Example I, 6α-difluoromethyl-hydrocortisone and 6α - trifluoromethyl - hydrocortisone were converted into the corresponding 21-tosylates, 6α-difluoro- and 6α-trifluoromethyl-Δ⁴-pregnene-11β,17α-diol-3,20-dione, 6α-difluoro- and 6α-trifluoromethyl-Δ⁴,⁹⁽¹¹⁾-pregnadien-17α-ol-3,20-dione, 6α-difluoromethyl-9α,11β-dichloro - Δ⁴ - pregnen-17α-ol-3,20- dione and 6α-trifluoromethyl-9α,11β-dichloro-Δ⁴-pregnen-17α-ol-3,20-dione.

*Example V*

A mixture of 1.25 g. of 6α-difluoromethyl-9α,11β-dichloro-Δ⁴-pregnen-17α-ol-3,20-dione, 2.5 g. of chloranil and 10 cc. of terbutanol was refluxed for 24 hours. The mixture was cooled, the excess of chloranil filtered and washed with ethyl acetate and the organic extracts washed with a cold aqueous solution of 10% sodium hydroxide until the washings were colorless. It was then dried over anhydrous sodium sulfate and the ethyl acetate was evaporated. Recrystallization from methylene chloride ether, after decolorization with alumina gave 6-difluoromethyl-9α,11β-dichloro - Δ⁴,⁶ - pregnadien - 17α-ol-3,20-dione.

Treatment of the above compound with acetic anhydride p-toluenesulfonic acid in benzene solution gave the corresponding acetate.

*Example VI*

In accordance with the method of Example I, 2 g. of 6α-difluoromethtyl-16β-methyl-hydrocortisone was converted into its 21-tosylate, 6α-difluoromethyl-16β-methyl-Δ⁴-pregnene-11β,17α-diol-3,20-dione, 6α - difluoromethyl-16β-methyl - Δ⁴,⁹⁽¹¹⁾ - pregnadien - 17α - ol - 3,20 - dione and 6α-difluoromethyl - 16β - methyl - 9α,11β - dichloro-Δ⁴-pregnen-17α-ol-3,20-dione.

A mixture of 0.5 g. of the latter compound, 25 cc. of t-butanol, 0.2 g. of selenium dioxide and 0.1 cc. of pyridine was refluxed under an atmosphere of nitrogen for 48 hours, filtered through celite and the filter was washed with a little hot t-butanol. The combined filtrate and washings was evaporated to dryness under reduced pressure. The residue was refluxed for 1 hour with decolorizing charcoal in acetone, filtered from the charcoal and the filtrate was evaporated to dryness. Chromatography of the residue on washed alumina yielded 6α-difluoromethyl-16β-methyl-9α,11β-dichloro-Δ¹,⁴-pregnadien-17α-ol-3,20-dione.

Upon treatment of the above compound with chloranil in t-butanol, in accordance with the method of Example IV, there was obtained 6-difluoromethyl-16β-methyl-9α,11β-dichloro-Δ¹,⁴,⁶-pregnatrien-17α-ol-3,20-dione.

*Example VII*

By following the method of Examples I and II, 5 g. of 6α-trifluoromethyl-16α-methyl-hydrocortisone was converted into its 21-tosylate, 6α-trifluoromethyl-16α-methyl-Δ⁴-pregnene-11β,17α-diol-3,20-dione, 6α-trifluoromethyl-16α-methyl-Δ⁴,⁹⁽¹¹⁾-pregnadien-17α-ol-3,20-dione, 6α-trifluoromethyl - 16α - methyl - 9α,11β - dichloro - Δ⁴ - pregnen-17α-ol-3,20-dione and 6α-trifluoromethyl-16α-methyl-9α,11β-dichloro-Δ⁴-pregnen-17α-ol-3,20-dione acetate.

The above compound was refluxed for 24 hours with 2,3-dichloro-5,6-dicyano-1,4-benzoquinone, in dioxane solution, in accordance with the method of Example III, thus giving 6α-trifluoromethyl-16α-methyl-9α,11β-dichloro-Δ¹,⁴-pregnadien-17α-ol-3,20-dione acetate.

*Example VIII*

By following the esterification method of Example III, 1 g. of 6α-trifluoromethyl-9α,11β-dichloro-Δ⁴-pregnen-17α-ol-3,20-dione was converted into the corresponding propionate.

A mixture of 1 g. of the above compound, 2 g. of chloranil, 20 cc. of ethyl acetate and 5 cc. of acetic acid was refluxed under an atmosphere of nitrogen for 8 hours. The mixture was cooled, washed with a cold aqueous solution of 10% sodium hydroxide until the washings were colorless. The organic solution was dried over anhydrous sodium sulfate and the ethyl acetate was evaporated. By chromatography of the residue on neutral alumina there was obtained 6-trifluoromethyl-9α,11β-dichloro-Δ⁴,⁶-pregnadien-17α-ol-3,20-dione propionate.

Upon treatment of the latter compound with selenium dioxide in terbutanol, in accordance with the method of Example VI, there was produced 6-trifluoromethyl-9α,11β-dichloro-Δ¹,⁴,⁶-pregnatrien-17α-ol-3,20-dione propionate.

*Example IX*

By following the method of Example II, but using cyclopentylpropionic anhydride instead of acetic anhydride, 6α-monofluoromethyl - 9α,11β - dichloro - Δ⁴ - pregnen - 17α-ol-3,20-dione, 6-difluoromethyl-9α,11β-dichloro-Δ⁴,⁶-pregnadien-17α-ol-3,20-dione, 6α-difluoromethyl-16β-methyl-9α,11β-dichloro-Δ¹,⁴-pregnadien-17α-ol-3,20-dione and 6α-trifluoromethyl - 16α-methyl - 9α,11β - dichloro - Δ⁴-pregnen-17α-ol-3,20-dione were converted into the corresponding cyclopentylpropionates.

*Example X*

In accordance with the method of Example I, 3 g. of 6α-difluoromethyl-16α-methyl-hydrocortisone was converted successively into its 21-tosylate, 6α-difluoromethyl-16α - methyl-Δ⁴-pregnene-11β,17α-diol-3,20-dione, 6α-difluoromethyl - 16α - methyl - Δ⁴,⁹⁽¹¹⁾ - pregnadien - 17α-ol-3,20-dione, and 6α-difluoromethyl-16α-methyl-9α,11β-dichloro-Δ⁴-pregnen-17α-ol-3,20-dione.

The latter compound was treated with chloranil in mixture with ethyl acetate and acetic acid, according to the procedure of Example VIII, thus producing 6-difluoromethyl - 16α - methyl - 9α,11β - dichloro - Δ⁴,⁶ - pregnadien-17α-ol-3,20-dione.

Further treatment with 2,3-dichloro-5,6-dicyano-1,4-benzoquinone in dioxane solution, in accordance with the method of Example III, gave 6-difluoromethyl-16α-methyl-9α,11β-dichloro-Δ¹,⁴,⁶-pregnatrien-17α-ol-3,20-dione.

*Example XI*

A solution of 1 g. of 6α-difluoromethyl-16α-methyl-9α,11β-dichloro-Δ⁴-pregnen-17α-ol-3,20-dione, obtained in the previous example, 1 g. of p-toluenesulfonic acid, 50 cc. of acetic acid and 10 cc. of acetic anhydride was kept at room temperature for one hour; it was then poured into water and stirred until the excess of anhydride was hydrolyzed. The product was extracted with ethylacetate and the organic extract was washed to neutral, dried over anhydrous sodium sulfate and evaporated to dryness. Chromatography of the residue on neutral alumina gave the pure 6α-difluoromethyl - 16α - methyl - 9α,11β - dichloro - Δ⁴-pregnen-17α-ol-3,20-dione acetate.

*Example XII*

By following the method of Example I, 6α-monofluoromethyl-16α-methyl-hydrocortisone was converted into its 21 - tosylate, 6α-monofluoromethyl-16α-methyl-Δ⁴-pregnene-11β,17α-diol-3,20-dione, 6α-monofluoromethyl-16α-methyl - Δ⁴,⁹⁽¹¹⁾ - pregnadien-17α-ol-3,20-dione and 6α-monofluoromethyl - 16α - methyl - 9α,11β - dichloro - Δ⁴-pregnen-17α-ol-3,20-dione.

Dehydrogenation of the compound with selenium dioxide in t-butanol, in accordance with the method of Example VI, gave 6α-monofluoromethyl-16α-methyl-9α, 11β-dichloro-Δ¹,⁴-pregnadien-17α-ol-3,20-dione.

500 mg. of the latter compound were acetylated in accordance with the method of the preceding example, and the resulting acetate treated with chloranil in t-butanol, thus producing 6-monofluoromethyl-16α-methyl - 9α,11α - dichloro - Δ¹,⁴,⁶ - pregnatrien - 17α - ol - 3,20-dione acetate.

*Example XIII*

In accordance with the method of Example XI, 6-difluoromethyl - 16β - methyl - 9α,11β - dichloro - Δ¹,⁴,⁶-pregnatrien - 17α - ol - 3,20 - dione, 6 - difluoromethyl-16α - methyl - 9α,11β - dichloro - Δ⁴,⁶ - pregnadien-17α-ol- 3,20-dione and 6-difluoromethyl-16α-methyl-9α,11β - dichloro - Δ¹,⁴,⁶ - pregnatrien - 17α - ol - 3,20-dione were converted into the corresponding acetates.

We claim:
1. A compound of the following formula:

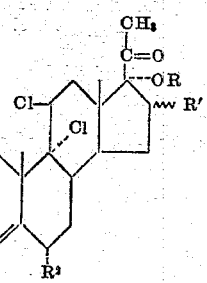

wherein R is selected from the group consisting of hydrogen and a hydrocarbon carboxylic acyl group of less than 12 carbon atoms; R' is selected from the group consisting of hydrogen, α-methyl and β-methyl; and $R^2$ is selected from the group consisting of a monofluoromethyl, a difluoromethyl and a trifluoromethyl group.

2. 6α - monofluoromethyl - 9α,11β - dichloro - Δ⁴- pregnen-17α-ol-3,20-dione acetate.

3. 6α - monofluoromethyl - 9α,11β - dichloro - Δ⁴- pregnen-17α-ol-3,20-dione cyclopentylpropionate.

4. 6α - difluoromethyl - 16α - methyl - 9α,11β - dichloro-Δ⁴-pregnen-17α-ol-3,20-dione acetate.

5. 6α - trifluoromethyl - 9α,11β - dichloro - Δ⁴ - pregnen-17α-ol-3,20-dione acetate.

6. 6α - trifluoromethyl - 9α,11β - dichloro - Δ⁴ - pregnen-17α-ol-3,20-dione propionate.

7. 6α - trifluoromethyl - 16α - methyl - 9α,11β - dichloro - Δ⁴ - pregnen - 17α - ol - 3,20 - dione cyclopentylpropionate.

8. A compound of the following formula:

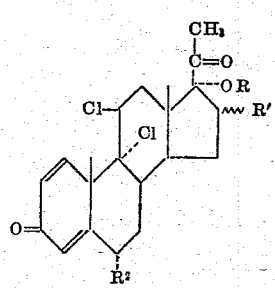

where R is selected from the group consisting of hydrogen and a hydrocarbon carboxylic acyl group of less than 12 carbon atoms; R' is selected from the group consisting of hydrogen, α-methyl, and β-methyl; and $R^2$ is selected from the group consisting of a monofluoromethyl, a difluoromethyl and a trifluoromethyl group.

9. 6α - monofluoromethyl - 9α,11β - dichloro - Δ¹,⁴- pregnadien-17α-ol-3,20-dione propionate.

10. 6α - monofluoromethyl - 16α - methyl - 9α,11β- dichloro-Δ¹,⁴-pregnadien-17α-ol-3,20-dione acetate.

11. 6α - difluoromethyl - 16β - methyl - 9α,11β - dichloro - Δ¹,⁴ - pregnadien - 17α - ol - 3,20 - dione cyclopentylpropionate.

12. 6α - trifluoromethyl - 16α - methyl - 9α,11β - dichloro - Δ¹,⁴ - pregnadien - 17α - ol - 3,20 - dione acetate.

13. A compound of the following formula:

wherein R is selected from the group consisting of hydrogen and a hydrocarbon carboxylic acyl group of less than 12 carbon atoms; R' is selected from the group consisting of hydrogen, α-methyl and β-methyl and $R^2$ is selected from the group consisting of a monofluoromethyl, a difluoromethyl and a trifluoromethyl group.

14. 6 - difluoromethyl - 9α - 11β - dichloro - Δ⁴,⁶ - pregnadien-17α-ol-3,20-dione acetate.

15. 6 - difluoromethyl - 9α,11β - dichloro - Δ⁴,⁶ - pregnadien-17α-ol-3,20-dione cyclopentylpropionate.

16. 6 - difluoromethyl - 16α - methyl - 9α,11β - dichloro - Δ⁴,⁶ - pregnadien - 17α - ol - 3,20 - dione acetate.

17. 6 - trifluoromethyl - 9α,11β - dichloro - Δ⁴,⁶ - pregnadien-17α-ol-3,20-dione propionate.

18. A compound of the following formula:

wherein R is selected from the group consisting of hydrogen and a hydrocarbon carboxylic acyl group of less than 12 carbon atoms; R' is selected from the group consisting of hydrogen, α-methyl and β-methyl; and $R^2$ is selected from the group consisting of a monofluoromethyl, a difluoromethyl and a trifluoromethyl group.

19. 6-monofluoromethyl - 16α - methyl - 9α,11β - dichloro-Δ¹,⁴,⁶-pregnatrien-17α-ol-3,20-dione acetate.

20. 6 - difluoromethyl - 16α - methyl - 9α,11β - dichloro-Δ¹,⁴,⁶-pregnatrien-17α-ol-3,20-dione acetate.

21. 6 - difluoromethyl - 16β - methyl - 9α,11β - dichloro-Δ¹,⁴,⁶-pregnatrien-17α-ol-3,20-dione acetate.

22. 6 - trifluoromethyl - 9α,11β - dichloro - Δ¹,⁴,⁶- pregnatrien-17α-ol-3,20-dione propionate.

References Cited in the file of this patent
UNITED STATES PATENTS
2,894,963    Gould et al. _____ July 15, 1959

UNITED STATES PATENT OFFICE
CERTIFICATE OF CORRECTION

Patent No. 3,036,098   May 22, 1962

Albert Bowers et al.

It is hereby certified that error appears in the above numbered patent requiring correction and that the said Letters Patent should read as corrected below.

Column 2, lines 3 to 64, the formulas should appear as shown below instead of as in the patent:

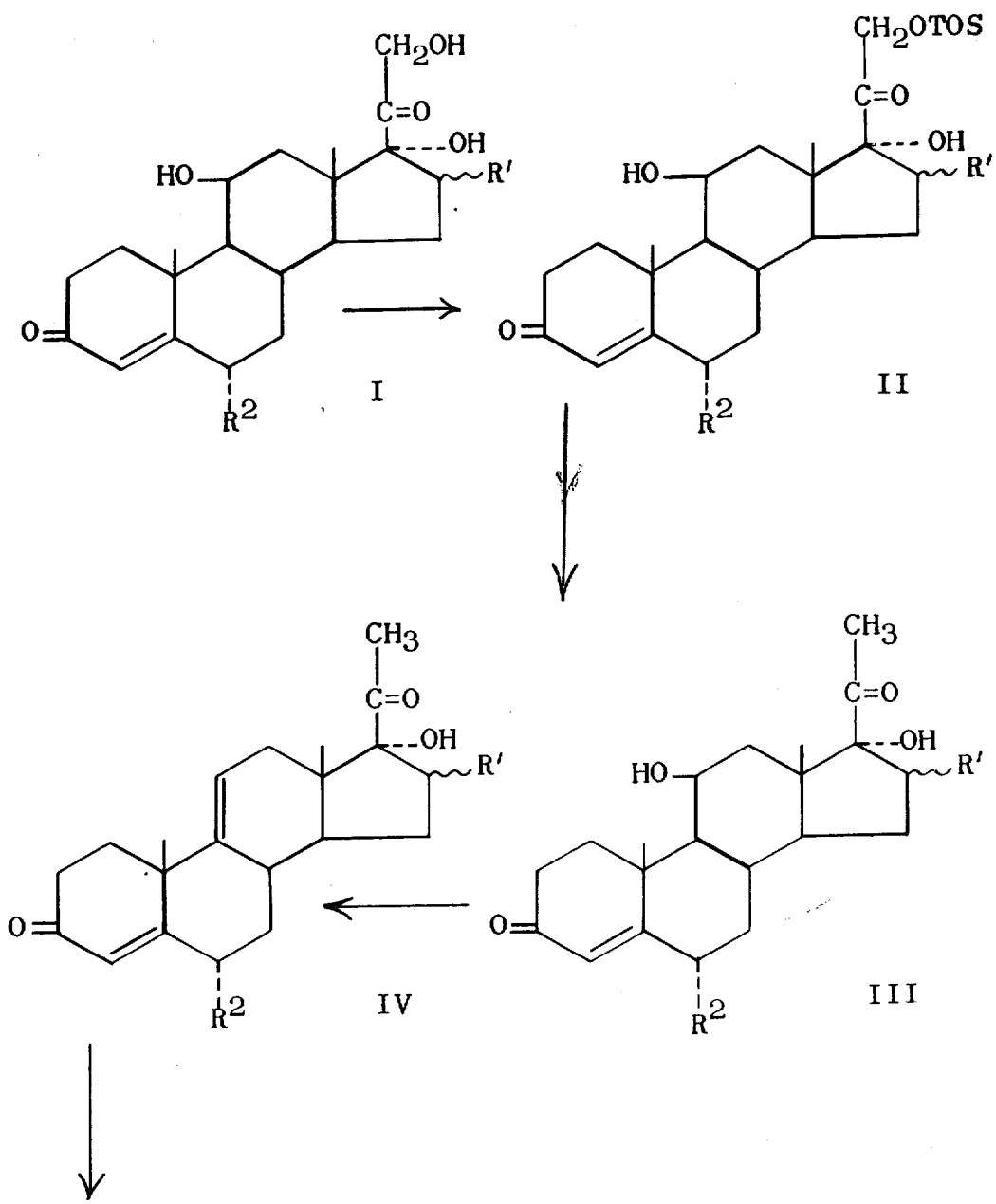

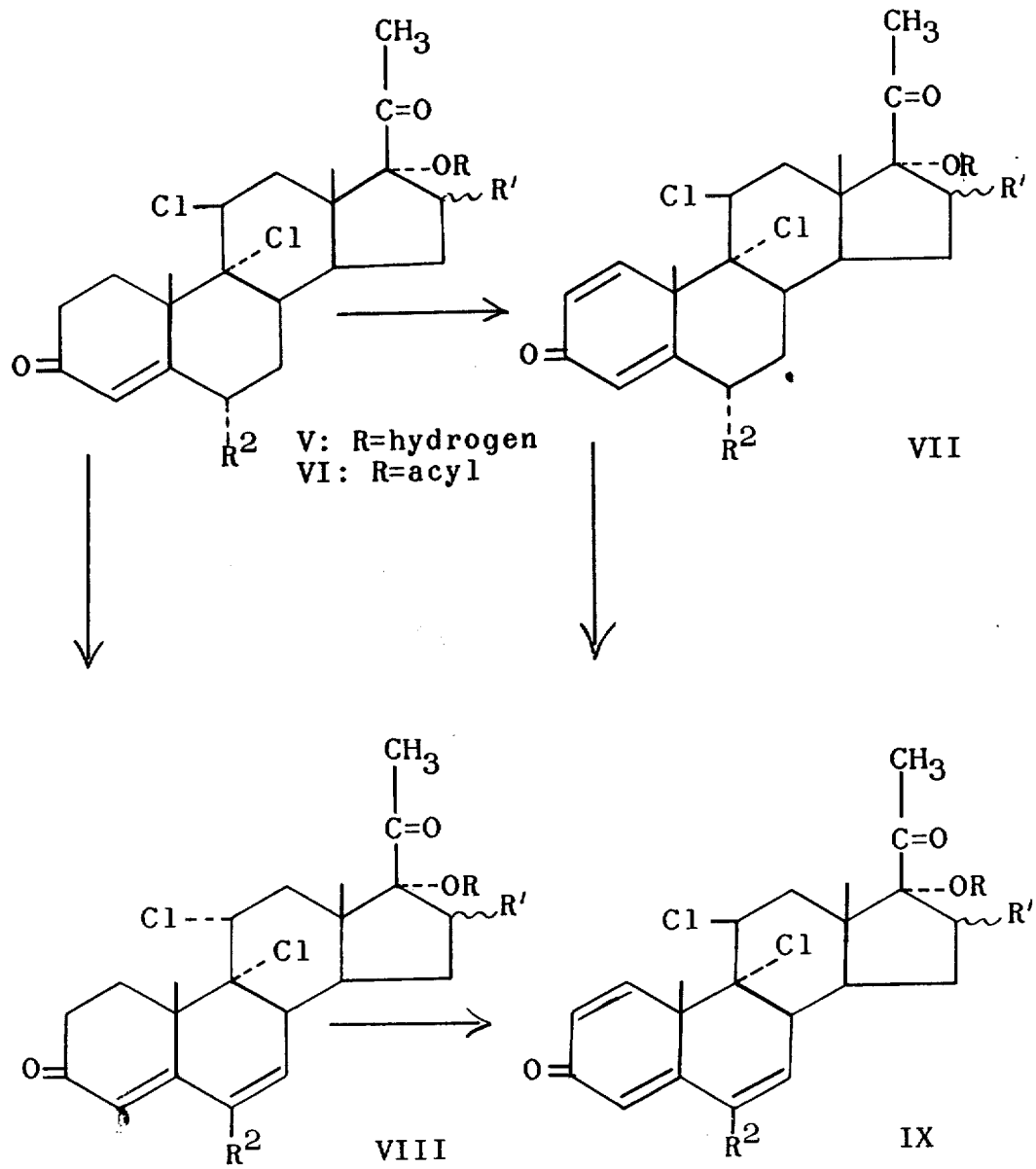

Signed and sealed this 4th day of September 1962.

(SEAL)
Attest:

NEST W. SWIDER
testing Officer

DAVID L. LADD
Commissioner of Patents